Feb. 25, 1964　　　E. E. INNIS　　　3,122,265
FOOD SERVER

Filed July 16, 1962　　　2 Sheets-Sheet 1

INVENTOR.
E. E. Innis

Feb. 25, 1964

E. E. INNIS 3,122,265

FOOD SERVER

Filed July 16, 1962

INVENTOR.

E. E. Innis

1

3,122,265
FOOD SERVER
Elbert E. Innis, 4714 Amherst Drive, Bartlesville, Okla.
Filed July 16, 1962, Ser. No. 210,000
4 Claims. (Cl. 220—97)

This invention relates to equipment for use in the serving of food. In one aspect it relates to a combination of tray and dishes which can be stacked to facilitate serving meals to a number of people.

There is a need for equipment which can simplify and expedite serving food to a large number of people. In institutions such as schools and boarding homes the problem of serving meals quickly and easily has forced the adoption of cafeteria style self-service whenever possible. In hospitals meals must be carried to the patients and in many other situations, such as banquets and club luncheons, it is desirable to serve the diners at the table. The problem is particularly acute aboard airliners where the existing practice is to prepare each tray in the galley and then carry the loaded trays two at a time to the passengers. This requires many trips up and down the aisles and in some cases the time and effort involved in serving food has required the addition of extra personnel to flight crews.

By my invention a food server is provided which enables one person to carry safely and easily full meals for several people. As currently practiced by airline hostesses, food is placed in individual dishes which are positioned on trays. With the server of my invention, however, the trays can be stacked fully loaded with food and carried six or more at a time, thereby making possible the reduction by at least a third the number of trips necessary to serve the passengers. This is done with a combination of dishes and tray having a plurality of depressions to receive the dishes. The dishes are of varying depth, as is customary, suitably proportioned for the type of food which each is to accommodate. The depressions in the tray are also of varying depth, the depth of each depression corresponding to the depth of the dish or receptable which it holds so that the upper rims of the receptables are of uniform height. Another tray of identical design can then be placed atop the assembled dishes without danger of tipping. In a preferred embodiment the trays have grooves in their lower surfaces corresponding to the peripheral configuration of the dishes on which they rest in stacked position so that the rims of the dishes fit into the grooves of the tray above them. This stabilizes the assembly and seals the dishes to prevent food from spilling. As a further improvement the bottom of each tray is recessed in the areas which lie above the more shallow dishes on which the tray is stacked. The food in these dishes can thus be permitted to extend above their upper rims without touching the bottom of the covering tray. A flat tray with ridges on its upper surface corresponding to the grooves in the bottom of the serving tray can be placed beneath the bottommost tray to provide an even surface for the hand when carrying the stacked assembly. Since the depressions of varying depth require the tray to have substantial thickness, it is desirable that the center portion of the tray body have a cellular structure, as in a foamed plastic, to lighten the tray and insulate the food.

It is an object of my invention to provide an improved food server. Another object of my invention is to provide a combination of tray and dishes that can be stacked and transported several trays at a time while fully loaded with food. Another object is to provide a serving tray which can be used to support a plurality of dishes and also act as a cover for dishes assembled on an identical tray. Still another object is to provide a tray and dish assembly which can be stacked one assembly atop another with food in the dishes without danger of spilling the food. Still another object of my invention is to provide such an assembly which helps maintain the temperature of the food contained in the dishes. Other objects, advantages, and features of my invention will be apparent to those skilled in the art from the following discussion and drawing in which:

Figure 1:
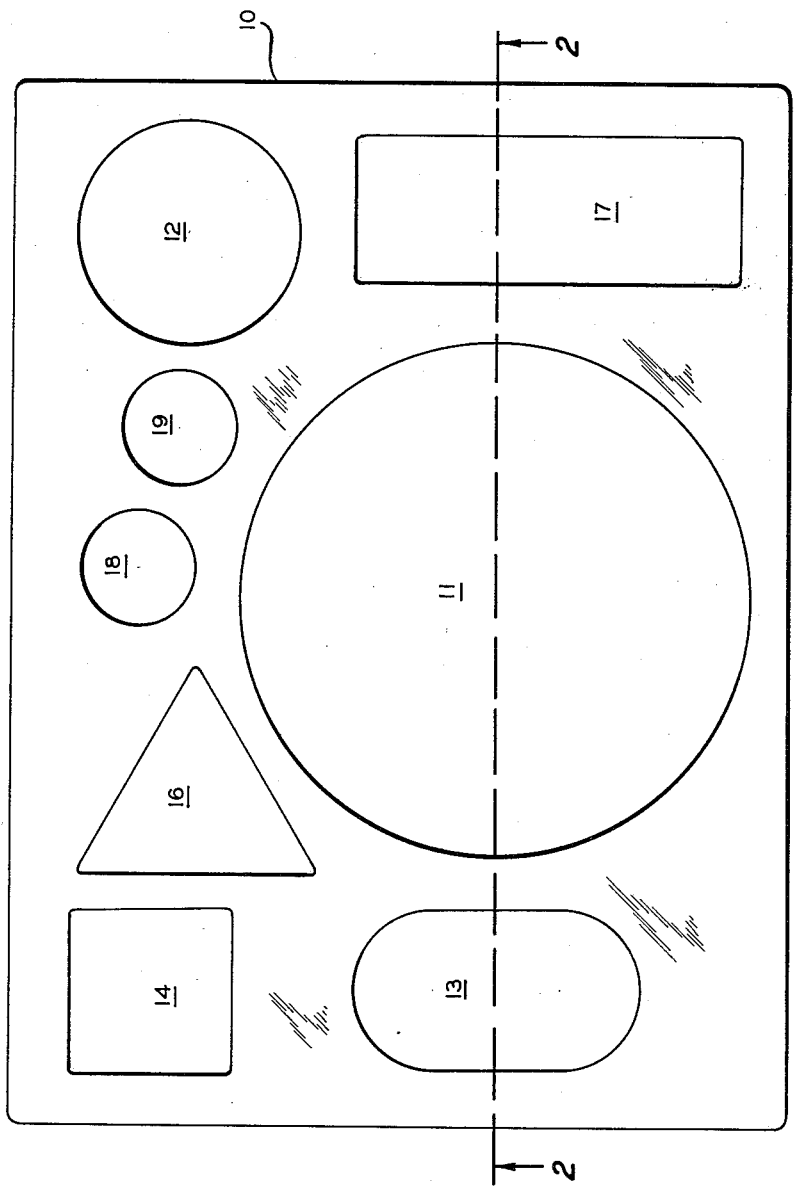
FIGURE 1 is a plan view of a tray in which the depressions are of varying peripheral outline corresponding to the receptacles to be placed therein.

The server of my invention is particularly well suited for serving full dinners using several dishes. The stacking feature is also of advantage, however, when serving simple snacks involving only two dishes. Ordinarily each dish has a different depth best suited for its specific use, but it is necessary only that dishes of two different depths be employed. It is desirable that each dish have a characteristic shape that makes it readily identifiable for positioning in its correct depression in the tray. This is illustrated by FIGURE 1 of the drawing.

Referring to FIGURE 1, a plan view of a tray 10 is shown, the tray having a plurality of depressions in its upper surface. The large circular depression 11 accommodates a plate as would be used for an entree, e.g. a meat dish and vegetable. Since the plate should be shallow, depression 11 is also quite shallow, ordinarily only deep enough to prevent the dish from sliding. The circular depression 12 of intermediate diameter holds a cup, normally the deepest receptacle used. Accordingly the depth of depression 12 is sufficient to place the upper rim of the cup at the same level as the upper rim of the plate when the tray is held in a horizontal position.

The remaining depressions accommodate dishes of varying utility. For example, elliptical depression 13 can hold a salad dish. The square depression 14 can hold a dish for dessert while a fruit cup can be placed in triangular depression 16. A rectangular receptacle which holds napkin, eating utensils and seasoning can be placed in depression 17. Preferably each of the depressions 11–17 have a depth in proper relationship to the depth of its corresponding receptable to place the upper rims of all the receptacles at the same level. Some departure from this rule can be tolerated provided a stable base is formed on which to set another tray. For example, if the receptacles in the four corners of the tray have their rims at the same height, the rims of the dishes positioned toward the center of the tray can extend to a lesser height. The small circular depressions 18 and 19 can be used to hold covered cups of salad dressing, cream or dessert topping. These depressions can be proportioned as the others or they can be of a depth only sufficient to keep these small cups from sliding. Preferably these cups are held close enough to the bottom of the next tray when the assembly is stacked that the cups cannot tip and fall from their depressions.

Each dish has a shape corresponding to the depressions shown in tray 10. Whenever the depths of the dishes vary it is preferred that their diameter or configuration also vary so that no mistake can be made in placing the dish in the wrong depression for to do so would provide an uneven base on which to place the next tray. The walls of the dishes can be substantially vertical or they can be tapered inwardly toward their bottoms to permit nesting when not in use.

Figure 2:
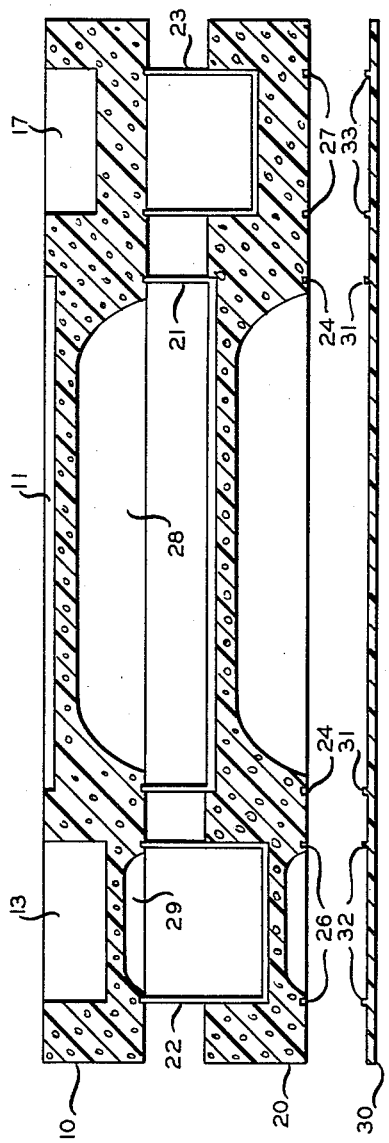
FIGURE 2 is a full cross sectional view of two trays and one set of dishes in stacked relationship with a support tray shown spaced below.

The stacking of the trays and dishes is illustrated in FIGURE 2 which is an elevation view in cross section along line 2—2 of FIGURE 1. In FIGURE 2, tray 10 is stacked atop the dishes in an identical tray 20. The varying depths of depressions 11, 13 and 17 are clearly shown. Plate 21, salad bowl 22, and utensil holder 23 are positioned in corresponding depressions in identical tray 20. Even though the depth of each of these receptacles is different, the upper rims of all the receptacles are at the same level, securely supporting tray 10.

Tray 20 has a circular groove 24, an elliptical groove 26, and a rectangular groove 27 in the bottom surface thereof, corresponding in outline to the outlines of depressions 11, 13, and 17, respectively, as shown in FIGURE 1. Tray 20 also has grooves, not shown, of outline and position corresponding to depressions 12, 14 and 16 as shown in FIGURE 1. Tray 10 is identical and the grooves in its bottom surface are shown in FIGURE 2 in registry with the upper rims of the dishes on tray 20. These grooves give stability to the stacked assembly and effectively seal the dishes to minimize accidental spilling.

Since each tray serves as a cover for the dishes on which it rests, cavities are provided in the bottom surface of the tray in the areas bounded by the grooves. These cavities have the same general shape as the depressions shown in FIGURE 1 but are somewhat smaller to allow space for the grooves. The depths of the cavities vary depending upon the depths of the depressions in the upper surface of the tray. Thus the deepest cavity is positioned to fit over the plate and the other cavities are correspondingly more shallow. Ordinarily there would be no need for a cavity over the cup or the utensil holder. As shown in FIGURE 2, tray 10 has a cavity 28 over plate 21 and a cavity 29 over bowl 22. Other cavities not shown are positioned over the dessert dish and fruit cup.

With cavities in the bottom surface of the bottom tray in a stacked group of trays and dishes, it would be difficult to hold the stack on one hand while removing trays with the other hand. This difficulty is overcome by placing a flat tray 30 under the bottommost tray. Tray 30 is shown in cross section in FIGURE 2 in spaced relationship to tray 20. Tray 30 provides a flat surface against which to place the hand in supporting the stacked trays. For stability tray 30 has ridges 31, 32 and 33 on its upper surface. These ridges fit into grooves 24, 26 and 27, respectively, of tray 20. Other ridges not shown are provided to fit into the other grooves of tray 20.

Figure 3:
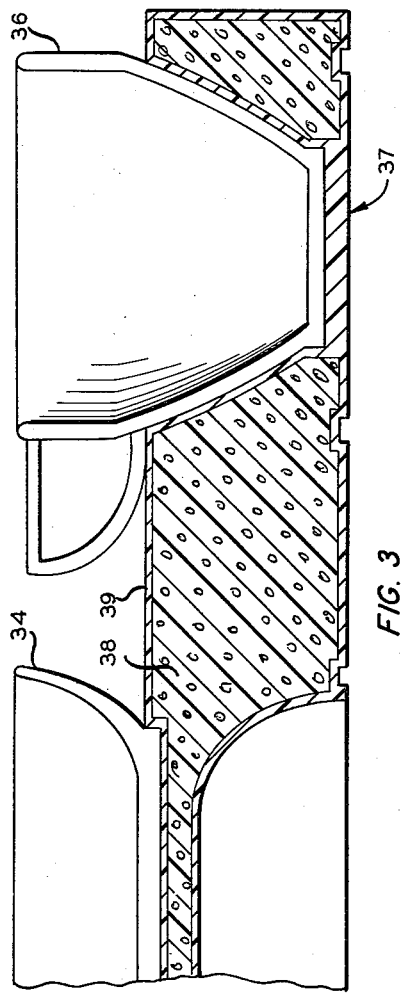
FIGURE 3 is an enlarged partial view in cross section of a tray and dishes assembled.

FIGURE 3 shows a partial view in cross section of a tray holding a plate 34 and a cup 36 which have tapered sides to permit nesting when not in use. The tray 37 has a foamed plastic core 38 and a fused plastic skin 39. This structure provides a strong, light tray which insulates the food in the dishes, particularly in those dishes which fit into the deeper depressions. As shown in FIGURE 3, the combination of tray and dishes makes an attractive, serviceable unit.

It can be seen that the tray of my invention must have substantial thickness, more than is customary for conventional trays. Its thickness need not be so great, however, as to complicate storage or handicap its use as a support for the dishes during a meal. For example, a convenient size for the tray would be 12 by 16 inches by $1\frac{9}{16}$ inches thick. Such a tray would accommodate a plate 8 inches in diameter and $1\frac{1}{8}$ inches deep and a cup 3 inches in diameter and $2\frac{3}{8}$ inches deep as well as other dishes correspondingly proportioned as shown in the drawing. With grooves $\frac{1}{16}$ inch deep and a depression for the cup $1\frac{3}{8}$ inches deep, the trays would stack $\frac{15}{16}$ inch apart and all of the dishes extend 1 inch above the upper surface of the tray supporting them. The distance from the bottom of one tray to the bottom of the tray above it when stacked would be $2\frac{1}{2}$ inches. Thus six trays loaded with dishes would stack to a height of only 15 inches.

Other variations and modifications can be made in my invention. For example, the depressions of varying depth can be in the bottom of the tray and sized to fit down over dishes positioned on a flat surface of a tray below. While such a modification would space the trays in parallel relationship, the embodiment illustrated in the drawing is preferred since it is much easier to assemble and the trays can be removed more readily for serving. The trays can be fabricated in two sections which are then joined to make a tray with a hollow core, or the core can be filled with insulating material. From the foregoing description one skilled in the art can provide other embodiments of my invention without departing from the spirit or scope thereof.

I claim:

1. A food serving tray assembly comprising a first tray having a substantially planar monolithic body having substantial thickness and generally upper and lower surfaces, said upper surface containing a plurality of depressions of varying depth and said lower surface containing a plurality of annular grooves positioned opposite upper-surface depressions and of corresponding peripheral shape and at least one concavity within the area defined by one of said grooves, and a second tray thinner than the first and having a flat continuous bottom surface and a plurality of annular ridges on its upper surface sized and positioned to register with said grooves on the bottom of said first tray when positioned thereunder.

2. A food server comprising, in combination,
   (1) at least two food containers having different depths and upwardly extending rims; and
   (2) a tray for supporting said containers, said tray having substantial thickness between upper and lower surfaces and at least two depressions in said upper surface for receiving said containers, said depressions having different depths correlated to the depths of said containers so that when said containers are positioned in the corresponding depressions with the tray level and horizontal, the upper rims of said containers are at a uniform height.

3. A food server comprising, in combination,
   (1) a plurality of food containers having various depths and upwardly extending rims; and
   (2) a tray having substantial thickness between upper and lower surfaces, a plurality of depressions in said upper surface of various depths corresponding to said containers and adapted to receive same so that the upper rims of said containers are at a uniform height, and a plurality of annular grooves in said lower surface opposite said depressions and of corresponding peripheral shape, the rim of each container being positionable within the groove opposite the depression receiving that container.

4. A stackable food serving assembly comprising, in combination,
   (1) a plurality of open-topped food containers having various depths and peripheral configurations;
   (2) a first tray having substantial thickness between upper and lower surfaces, a plurality of depressions in said upper surface of various depths and peripheral shapes corresponding to said containers and adapted to receive same so that the upper rims of said containers are at a uniform height, a plurality of annular grooves in said lower surface opposite said depressions and of corresponding peripheral shape, and at least one concavity in said lower surface within the area defined by at least one of said grooves; and (3) a second tray identical to said first tray and positionable atop said containers supported in the appropriate depressions in said first tray, the lower surface grooves in said second tray registering with the upper rims of said containers and each said concavity of said second tray permitting food in the container below to extend above the rim thereof without touching said second tray.

References Cited in the file of this patent
UNITED STATES PATENTS

| | | |
|---|---|---|
| 1,116,310 | Maser | Nov. 3, 1914 |
| 2,094,834 | Bowman | Oct. 5, 1937 |
| 2,743,030 | Read | Apr. 24, 1956 |
| 2,851,188 | Pavelle | Sept. 9, 1958 |
| 3,057,510 | Blacker | Oct. 9, 1962 |